(12) United States Patent
Okazaki et al.

(10) Patent No.: US 6,997,051 B2
(45) Date of Patent: Feb. 14, 2006

(54) FLOW SENSING DEVICE AND ELECTRONICS APPARATUS

(75) Inventors: Isao Okazaki, Mito (JP); Izumi Watanabe, Hitachinaka (JP); Hiroyuki Abe, Ohmiya (JP); Takayuki Yogo, Hitachinaka (JP); Shinya Igarashi, Naka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/619,432

(22) Filed: Jul. 16, 2003

(65) Prior Publication Data

US 2004/0050155 A1   Mar. 18, 2004

(30) Foreign Application Priority Data

Sep. 17, 2002   (JP)   ............................. 2002-269356

(51) Int. Cl.
*G01F 1/68*   (2006.01)

(52) U.S. Cl. .................................................. 73/204.22

(58) Field of Classification Search ............. 73/204.22, 73/204.26, 202.5
See application file for complete search history.

(56) References Cited

U.S. PATENT DOCUMENTS 6,070,462 A * 6/2000 Igarashi et al. .......... 73/204.22
6,176,131 B1 * 1/2001 Hecht et al. ............. 73/204.26
6,640,627 B2 * 11/2003 Sato et al. ............... 73/204.22

FOREIGN PATENT DOCUMENTS

JP   8-338279   12/1996

* cited by examiner

*Primary Examiner*—Harshad Patel
(74) *Attorney, Agent, or Firm*—Mattingly, Stanger, Malur & Brundidge, P.C.

(57) ABSTRACT

A structure is disclosed in which a conductive material having corrosiveness equal to or higher than that of the materials constituting electronics circuitry is disposed on halfway of the diffusion path of corrosive gases between an entrance place thereof and the electronics circuitry, whereby the conductive material traps the corrosive gases.

19 Claims, 8 Drawing Sheets

A-A SECTION

A-A SECTION

ENLARGED PORTION B

ENLARGED PORTION C

ENLARGED PORTION D
(SECTION OF PLATE-SHAPED STRUCTURE)

| Pd CONTENT | 1/3 | 1/6 | 1/12 | 1/24 |
|---|---|---|---|---|
| CORROSION RESISTANCE | HIGH ←  |  |  | → LOW |
| (PURITY OF Ag) | approx. 67% | approx. 83% | approx. 92% | approx. 96% |

FLOW SENSING DEVICE AND ELECTRONICS APPARATUS

BACKGROUND OF THE INVENTION

1. Field of the Invention

The present invention relates to a flow sensing device, or an electronics apparatus installed in an engine room of an internal combustion engine.

2. Description of the Related Art

As set forth in JP-A 8-338279, the electronics apparatus installed in an engine room has hitherto been configured so that the case thereof is formed of members such as a metal base, a resin housing, and a resin cover, and so that electronics circuitry is included inside the case.

In order to dissipate the self-heating of the electronics circuitry, the metal base is connected to the electronic circuit board with an adhesive therebetween, and it is made of a material high in heat dissipation efficiency and relatively inexpensive, such as aluminum. The adhesive connecting the metal base and the resin housing employs a material that is soft, extendable, weather-resistant, and chemical-resistant, such as silicone adhesive, in order to withstand thermal deformation due to the difference in the coefficient of thermal expansion between the metal base and the resin housing.

To electrically connect the electronics circuitry in its inside to the outside, the resin housing involves metal terminals by integral molding, and the connection between the resin housing and the electronics circuitry is established by aluminum wire bonding or welding.

The electrical circuitry portion is formed by printing conductors, resistors, and a thick insulating film paste, and baking them. In order to protecting conductors, the electrical circuitry may be formed by finally printing and baking a coating glass. However, in this case, land portions for soldering components and portions of the conductors themselves to which a measuring probe to be applied for characteristics adjustment, are left exposed.

SUMMARY OF THE INVENTION

An engine employs large numbers of resin/rubber components. While these resin/rubber components are new, they generate corrosive gases including sulfur. Meanwhile, it has been found that insert components, such as metal terminals integrally molded with the resin housing used in the above-described conventional electronics apparatus, each has a clearance, albeit minute, at the interface with the resin, so that this clearance can provide a path through which corrosive gases or the like enter the inside the electronics circuitry, at the interface between the resin housing and each of the metal terminals or the like communicating with the outside. It has further been found that, in the above-described conventional electronics circuitry, when a silicone adhesive is used between the metal base having charge of the heat dissipation for its self-heating and the resin housing, the gases pass through the silicone adhesive because the silicone adhesive has a relatively high gas permeability, so that silicon adhesive also provides a path through which corrosive gases or the like enter inside the electronics circuitry.

In order to protect its electronics circuitry, the conventional electronics apparatus uses glass coating formed by, e.g., thick film printing, and/or a protective material for electronics circuitry such as silicone gel superior in durability and watertightness.

However, the overcoating glass cannot protect the soldered portions and the exposed conductor portions for circuit checking. On the other hand, the silicone gel can prevent a liquid or solid as a corrosive medium from making direct contact with the conductors, but cannot prevent the entrance of gases because of its relative high gas permeability. This raises a problem in that, e.g., as is the case with the combination of sulfur and a silver or silver alloy conductor, even a small amount of gas actively reacts with conductors, depending on the kind of gas, thereby corroding and breaking wiring conductors.

It is an object of the present invention to prolong the lifetime against corrosive gases, of a flow sensing device or an electronics apparatus installed in an engine room of an internal combustion engine, by taking advantage of the fact that corrosive gases entering from the outside world has high reactivity with respect to specific substances.

The above-described object is achieved by a flow sensing device that includes a flow sensing element for sensing a flow of a gas; electronics circuitry for processing a signal from the flow sensing element, a case for protecting the electronics circuitry provided inside the case, and a trapping unit for trapping corrosive compositions entering from the outside of the case into the inside thereof, wherein the flow sensing device is installed in an intake air passage of an engine by inserting the flow sensing element into the intake air passage of the engine.

Furthermore, the above-described object is achieved by a flow sensing device that includes a flow sensing element for sensing a flow of a gas, electronics circuitry for processing a signal from the flow sensing element, and a case for protecting the electronics circuitry provided inside the case, wherein the flow sensing device is installed in an intake air passage of an engine by inserting the flow sensing element and the electronic circuitry into the intake air passage of the engine, and wherein silver, copper, a silver alloy containing at least 83% of silver, or a copper alloy containing at least 83% of copper each of which hardly affects the function of the electronics circuitry even if it becomes corroded, is disposed inside the case in an exposed state.

Moreover, the above-described object is achieved by an electronics apparatus that includes electronics circuitry, a case for protecting the electronics circuitry provided inside the case, and a trapping unit for trapping corrosive compositions entering from the outside of the case into the inside thereof, wherein the electronics apparatus is installed in an engine room.

DESCRIPTION OF THE PREFERRED EMBODIMENTS

Hereinafter, the embodiments of the present invention will be described with reference to the accompanying drawings.

Figure 1:
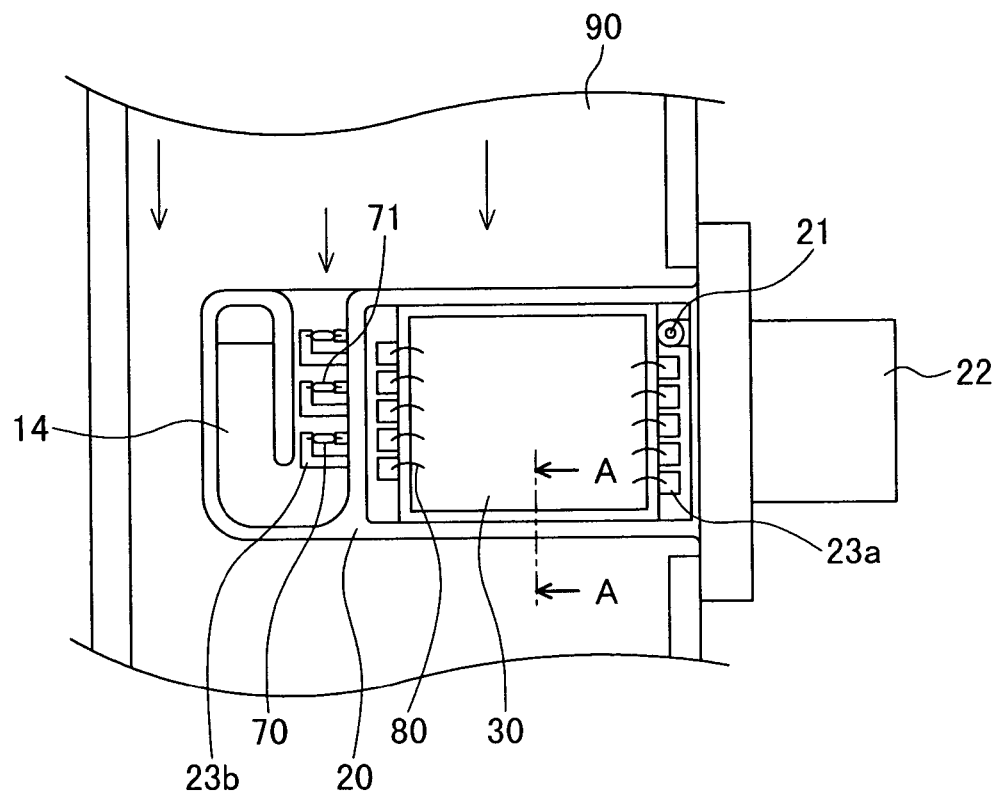
FIG. 1 is a front view showing an air flow meter according to the present invention.
Figure 2:
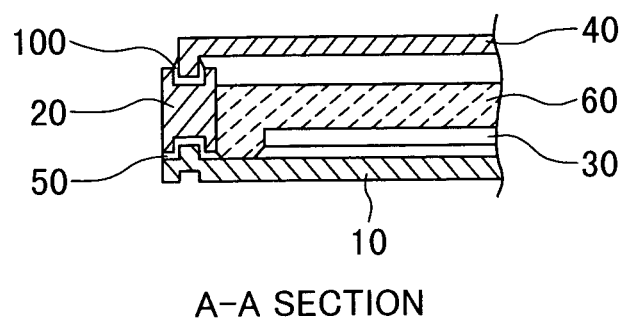
FIG. 2 is a sectional view showing a module structure according to the present invention.

FIG. 1 is a front view showing an air flow sensing apparatus, serving as a flow sensing device, according to a first embodiment of the present invention. FIG. 2 is a partial longitudinal sectional view of a module structure of this air flow sensing apparatus. The air flow sensing apparatus according to this embodiment is an electronic device which is installed in an engine room, and in which a heat resistor element 70 is provided, for the purpose of flow measurement, in a bypass passage 14 into which one portion of air passing through an air path 90 around this module to be supplied to an engine for an automobile, flows, whereby an electrical signal is outputted as an air flow signal from the heat resistor element 70 to an engine control unit via a terminal 23a and a connector 22, after the signal has been amplified on an electronic circuit board 30 via a terminal 23b.

The heat resistor element 70 is incorporated into a bridge circuitry included in the electronic circuit board 30, and is set to output an electrical signal corresponding to an air flow. For example, a current control is performed such that the heat resistor element 70 and a temperature sensitive resistor 71 each keep a constant resistance value at all times even if the heat dissipation amount of the heat resistor element 70 is changed by an air flow, and this current value is converted into a voltage value to output it as an air flow signal.

The terminal 23b, which connects the heat resistor element 70 and the electronic circuit board 30, and the terminal 23a, which connects the electronic circuit board 30 and the outside, are integrally molded with the resin housing 20. In order to dissipate its self-heating, the electronic circuit board 30 is bonded to the metal base 10 with an adhesive. The metal base 10 and the resin housing 20 are bonded together by, e.g., a silicone adhesive 50, in order to withstand thermal deformation due to the difference in the coefficient of thermal expansion therebetween.

Since the terminals 23a and 23b are integrally molded with the resin housing 20, there exists a clearance, albeit minute, at an interface between each of the terminals and the resin. As a result, the surrounding of the terminal 23b constitutes a gas passage communicating with the inside of the engine room, and the surrounding of the terminal 23a constitutes a gas passage communicating with the inside of the main air passage.

As shown in FIG. 2, the sectional structure of the flow sensing device according to this embodiment is one in which an electronic circuit board 30 is provided in a container formed of case members such as the metal base 10, the resin housing 20, and a resin cover 40, and in which silicone gel 60 is applied to the electronic circuit board 30 so as to cover for protecting the circuitry. The space between the resin cover 40 and the resin housing 20 is sealed by, for example, an epoxy adhesive 100.

On the electronic circuit board 30, which is made of a ceramic, circuitry is formed by the printing and baking of a thick film material, and the soldering of chip components. First, conductors constituting circuitry, such as a thick film material of silver or silver alloy are printed and baked. Next, all the several kinds of resistor materials each having a resistance value intended by the design are repeatedly printed and dried, and thereafter they are simultaneously baked. Then, overcoat glass coating is performed. Its main purposes are as follows.

One purpose is to cause overcoat glass coating to serves as a glass dam for inhibiting the flow-out of solders in a solder printing process and a heating-and-melting process each of which is performed after overcoat glass coating.

Depending on a resistor, its resistance value is measured after printing and baking to adjust the resistance value thereof, and the deviation from the design value is adjusted by laser-cutting the resistor. In this case, because the stability of laser-cutting varies among materials of overcoat glass, it is necessary to select an appropriate material.

Another purpose of applying an overcoat glass over the conductor is to cause overcoat glass coating to perform the function of preventing the occurrence of an inter-conductor bridge when a foreign material is mixed, and/or the occurrence of an inter-conductor short circuit due to solder balls, and also of protecting the conductors from corrosion and chemical changes by water and other chemical substances.

If overcoat glass coating can be performed with respect to the entire electronic circuit wiring, it would be easy to protect the wiring conductors from corrosive gases. However, because chip component portions to be connected by soldering and conductor portions for probing when conducting a performance adjustment such as resistor trimming, must be left exposed, measures to protect the wiring conductors by another structure are required.

The electronic circuit board 30 is bonded to the metal base 10 with, for example, the silicone adhesive 50, and it is housed in the case members comprising the resin housing 20 or the like. Then, the electronic circuit board 30 is electrically connected to the connector terminal and the like by aluminum wires, and a required adjustment of the electronics circuitry is performed. Finally, a circuit protective material such as the silicon gel 60 is filled into the case, and is cured. Likewise, the resin cover 40 is bonded to the resin housing 20 by applying and filling, for example, the epoxy adhesive 100.

In the air flow sensing apparatus made up in this manner, no perfect airtightness can be structurally secured between the inside and outside thereof, so that corrosive gases may arrive at the inside thereof, and consequently, they may corrode and break the wiring conductors in the electronics circuitry. The reasons for this are broadly classified into the following items.

1) Because the silicone adhesive has a relatively high gas permeability, it allows gaseous substances to pass therethrough. As a result, corrosive gases also diffuse into the silicone adhesive, and enters inside the case.

2) In the case where integrally-molded components such as the terminals 23a and 23b are connected to the outside as they are, corrosive gases diffuse inside the case through the minute clearance formed around each of the terminals 23a and 23b.

3) In any one of the above-described two cases, after having entered inside the case, the corrosive gases diffuse through the gas and the silicone gel existing inside the case, and ultimately arrive at the electronic circuit board.

The engine room is in an environment where a variety of components and materials exist. Because of the temperature rise due to the heating of the engine, and because of the existence of high voltage sparks and large numbers of chemical substances including gasoline, various substances exist around the electronics apparatus. In particular, substances existing as gases includes air, carbon dioxide, nitrogen and its compounds, sulfur and its compounds, ozone, gasoline vapor and hydrocarbons as its by-products.

Out of these, gases having high reactivity with respect to silver and copper, such as sulfur and its compounds, corrodes the conductors because of its high diffusion speed, when entering inside the case.

With regard to this problem, methods for increase the lifetime of the electronics apparatus will be provided below.

In an environment where thermal stresses are applied, as in the case where the electronics apparatus is installed in the engine room, it is indispensable to relax, by a soft material such as the silicone adhesive, thermal stresses caused by thermal deformations between structural members. However, because a new kind of material replacing this material is not yet in existence, it is impossible to completely shut out corrosive gases as described above. Eventually, the problem is how to eliminate entering gases without their arriving at the electronics circuitry.

The present invention is achieved by using a material having corrosiveness equal to or higher than that of the materials constituting the electronics circuitry located inside the electronics apparatus, and in order to trap corrosive gases, disposing the aforementioned material having high corrosiveness on halfway of the diffusion path of corrosive gases between an entrance place thereof and the electronics circuitry, depending on the relationship between the entrance place of the corrosive gases and the position of the electronic circuit board. Here, the term "trapping" includes combination, adsorption, occlusion, absorption, or the like.

Figure 3:
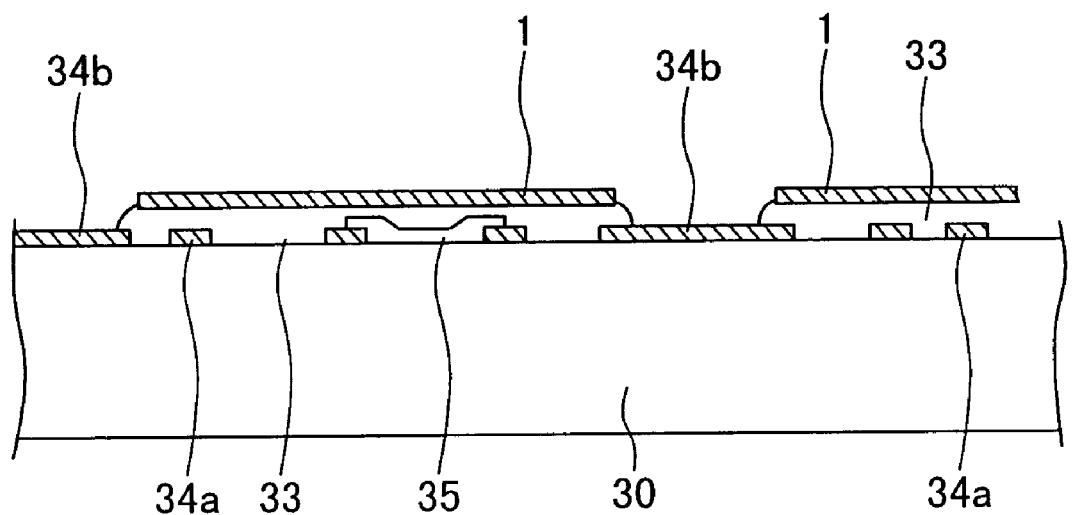
FIG. 3 is a sectional view showing an electronic circuit board according to the present invention.

FIG. 3 is a schematic sectional view showing an electronic circuit board according to the first embodiment of the present invention. This electronic circuit board is configured so that wiring conductors 34 (hereinafter collectively referring to portions 34a and 34b), resistors 35, and an insulating material (not shown) are thick-film printed and baked on the electronic circuit board 30 made of alumina. Portions 34a of the wiring conductors 34 are exposed to the air for reasons of the necessity for chip components to be soldered to the electronic circuit board 30 and for resistor trimming. The other wiring conductor portions 34b are covered with the insulating material. In this embodiment, a conductive material 1 for trapping corrosive gases is overlaid as an upper layer, by printing and baking, on a first-layer conductor 34 forming the electronic circuit wiring, with an insulating layer of a glass dielectric 33 therebetween. In the air flow sensing apparatus as shown in FIG. 2, corrosive gases diffusively enters from the silicone adhesive 50 used between the metal base 10 and the resin housing 20, as described above. The gases having arrived inside the electronics apparatus, further diffuse through the silicone gel 60, which is a protective material for the electronics circuitry, or the air inside the electronics apparatus, until arriving at the electronic circuit portion.

Figures 13, 14:
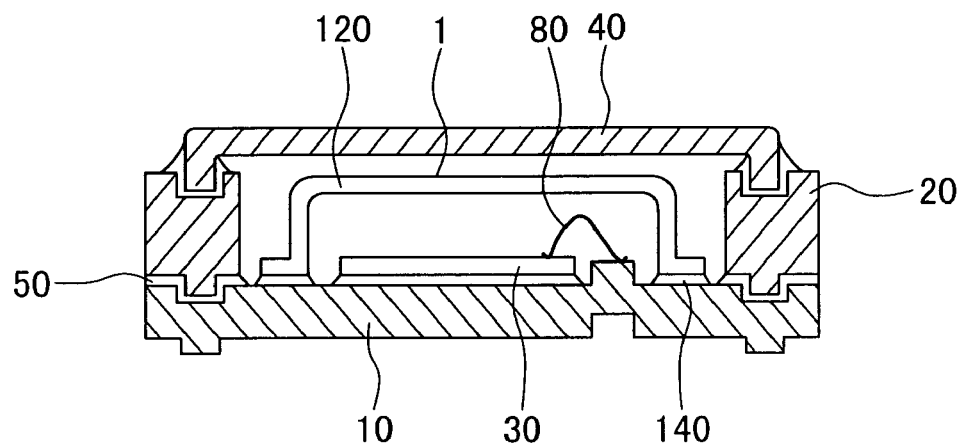
FIG. 13 is a sectional view showing a module incorporating an EMC (Electromagnetic Compatibility) shield according to the present invention.
FIG. 14 a representation of the relationship between the palladium content and the corrosion resistance.

Here, in the first-layer wiring conductors 34, portions not to be exposed is overspread with the insulating layer, thereby exerting the effect of minimizing the attack of corrosive gases. Also, because of the existence of the conductive material 1 located in the upper layer, corrosive gases react with the conductive material 1 in the upper layer with a probability higher than the probability that the corrosive gases attack the first-layer conductors 34 forming the electronic circuit wiring, and they are trapped in the upper layer. This allows the lifetime of the electronic circuit wiring against corrosion to be increased. In this embodiment, the conductive material 1 for trapping corrosive gases can be formed on the conductors 34 used for the electronics circuitry on the electronic circuit board by a method such as printing or the like, and therefore, the electronic circuit board according to this embodiment can be achieved only by adding, to the ordinary printing process, two processes: printing and baking of the insulating layer 33 and those of the conductive material 1. Furthermore, in this embodiment, by devising circuit patterns, the circuit patterns can be easily improved so as to protect electronics circuitry along the direction in which corrosive gases largely enter/diffuse in actuality, and a high degree of flexibility in pattern design is provided. The conductor 34 used for the electronics circuitry in the first layer and the conductive material 1 in the upper layer are each a silver base alloy or a copper base alloy. For example, when they, respectively, are an alloy of silver and palladium, and an alloy of copper and palladium, their corrosion resistances against corrosive gases increase with the increase in the content of palladium, as shown in FIG. 14. However, they become unfavorably more expensive and more unstable in characteristic as the content of palladium increases. In addition, their resistance values also increases with the content of palladium. Therefore, in order to provide an inexpensive and high-quality product, it is necessary to use silver, copper, a high purity silver alloy or a higher purity copper alloy. Here, by taking advantage of the reactivity of silver or copper with respect to corrosive gases, a structure capable of trapping corrosive gases and simultaneously capable of protecting the conductor wiring used for the electronics circuitry. Even when the first layer and the upper layer comprise the same material, the electronic circuit board according to this embodiment exerts its effect. However, using, in combination, a material having a somewhat lower purity for portions used for the wiring of the electronics circuitry, and a conductor having a very high purity for the conductive material 1 in the upper layer for trapping, allows a higher effect to be produced.

Figure 4A:
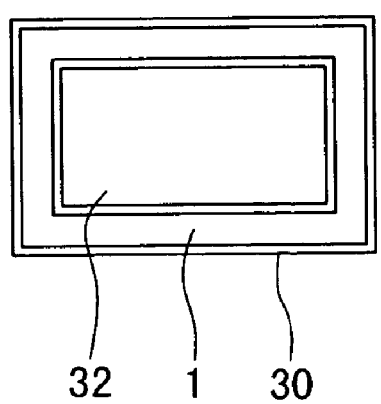
FIGS. 4A and 4B are front views showing constructions of the electronic circuit board according to the present invention.
Figure 4B:
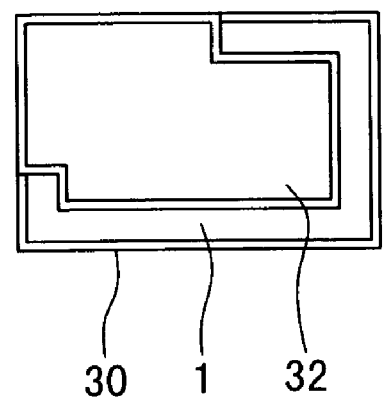

FIGS. 4A and 4B show printed surfaces of circuit boards according to the present invention. This printed surface is configured so that the conductive material 1 for trapping corrosive gases is formed over the entire end face of the circuit board, that is, the entire outermost periphery thereof, by means of printing and baking or the like, and so that the wiring portion 32 used for the electronics circuitry is contained inside the conductive material 1. The purpose of this is to protect the wiring conductors 34 used for the electronics circuitry by providing a film of the conductive material 1 for trapping corrosive gases, over the outermost peripheral portion of the board, taking advantage of the fact that the progress of corrosion begins from the outermost periphery when corrosive gases diffuse through an adhesive such as the silicon adhesive 50 situated between the metal base 10 and the resin housing 20, as described above. This method has an advantage in allowing the protection of the wiring conductors 34 to be achieved without an additional process, because, in this case, the wiring conductors 32 used for the electronics circuitry and, for example, simultaneously, the conductive material 1 for trapping corrosive gases can be formed by printing. Since the outermost peripheral portion is not used for the actual circuitry as a matter of course, the above-described method is specifically effective when there is an adequate room for the wiring patterns. Also, as in the case of the first embodiment, when corrosive gases has a tendency to permeate and diffuse in a specific direction, the circuit patterns may be changed in keeping with this tendency. Depending on circumstances, because the circuitry portion and the outermost peripheral portion would vie with each other to get possession of area, only one portion of the outermost periphery may be used as the conductive material 1, as shown in FIG. 4B. Here, disposing the conductive material 1 adjacent to the entrance path of corrosive gases would produce a higher effect. The wiring patterns may be connected to the ground potential so that the circuitry is hardly affected by floatation (isolation from the electronics circuitry) or corrosion. Depending on the kinds or the like of corrosive gases, the wiring patterns may be connected to a potential higher than the ground potential. It is also possible to estimate corrosion conditions from the change in resistance of the wiring patterns. Furthermore, it is suggested to use one portion or the entirety of the outermost periphery as an EMC (Electromagnetic Compatibility) shield. In this case, it is possible to produce a higher effect by thickening a wiring line and connecting it to the ground line of the electronics circuitry in any form. However, it cannot be denied that the reliability of this method is open to doubt since it is characteristically used for corrosion.

Figure 5A:
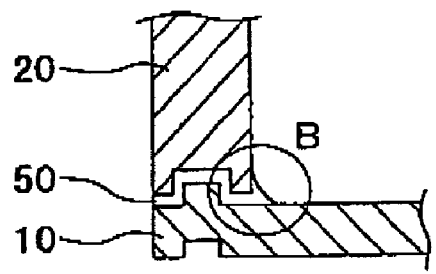
FIGS. 5A and 5B are sectional views showing an application portion of a silicone adhesive according to the present invention.
Figure 5B:
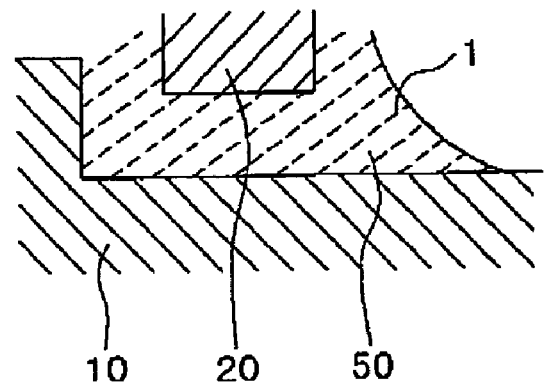

FIGS. 5A–5B show a third embodiment of the present invention. In this embodiment, in the situation where corrosive gases diffusively enter from the silicone adhesive 50 as in the cases of the first and second embodiments, the silicone adhesive 50 is used by mixing therein silver, copper, a silver alloy, or copper alloy subdivided into minute particles, foils, or needles. This method has an advantage that much of the corrosive gases can be trapped into the layer of silicone adhesive 50 before corrosive gases have completely entered the inside the electronics circuitry. That is, the corrosive gasses can be trapped at places more upstream in their diffusion path, thereby producing a significant effect. The electronic apparatus according to this embodiment is configured so that the surface area of the place used for reaction is sufficiently secured to trap a large amount of corrosive gases, by subdividing silver, copper, a silver alloy, or copper alloy into a shape such as not to obstruct the application of the silicone adhesive when mixed therein, such as minute particles, foils, or needles, and by mixing this in a large amount into the silicone adhesive.

Figure 6:
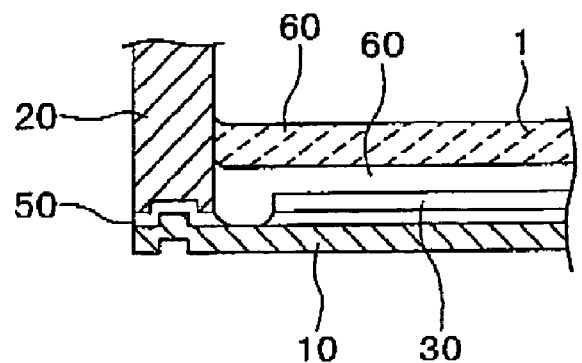
FIG. 6 is a sectional view showing an application portion of a silicone gel according to the present invention.

FIG. 6 shows a fourth embodiment of the present invention. This electronics apparatus is configured so that, after the conductive material 1 is mixed, in the shape of minute particles, foils, or needles, into the protective material for the electronics circuitry, such as the silicone gel 60 instead of the silicone adhesive 50, this is filled in the form of at least one layer, whereby a trap operation is performed at this silicone gel 60 portion. This method has an advantage that corrosive gases entering from portions other than the silicone adhesive 50 can also be trapped. Another advantage of the electronic apparatus according to this embodiment is that, by firstly filling the silicon gel 60 without the conductive material 1, as a first layer, and thereafter filling a second layer having the conductive material 1 mixed therein, an adverse effect, such as bridging, caused by the mixed conductive material 1 can be avoided.

Alternatively, by using protective materials mutually different in viscosity/hardness and selectively changing their fill amounts with respect to respective places to be filled, the most effect possible can be exerted when corrosion has a directional characteristic.

Figure 7:
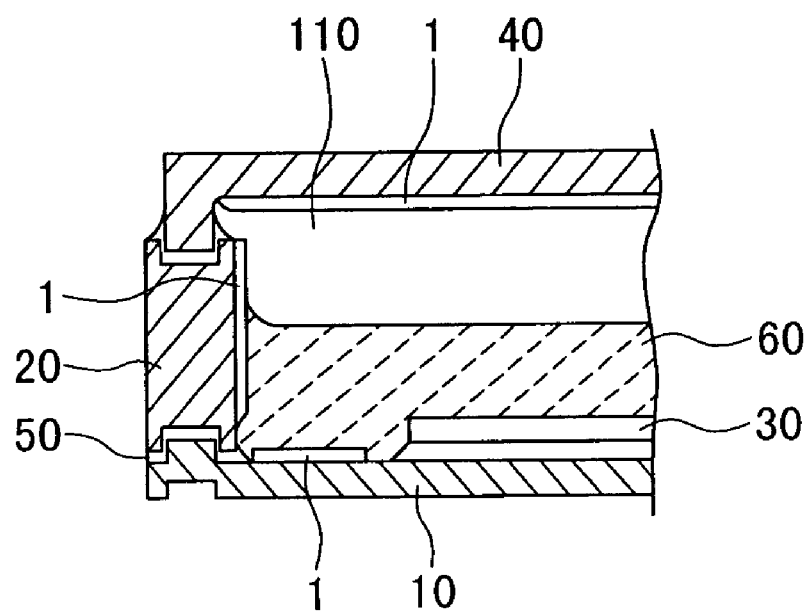
FIG. 7 is a sectional view showing a module structure according to the present invention.

FIG. 7 shows a fifth embodiment of the present invention, wherein a sectional structure of an electronics apparatus is illustrated. The electronics apparatus according to this embodiment is configured so that, on the inner wall portion of this electronics apparatus formed by assembling the case members comprising the resin housing 20, the resin cover 40, and the metal base 10, the conductive material 1 having corrosiveness equal to or higher than that of the materials constituting the electronics circuitry is formed into a layer shape, thereby trapping corrosive gases that has entered inside the electronics circuitry.

Here, the film of the conductive material 1 is selectively formed either over the entire area or on a highly effective area of the resin housing 20, the resin cover 40, the metal base 10, or the like, in order to effectively trap corrosive gases.

For example, when much of the entering corrosive gases are present in an air layer 110 inside the electronics apparatus, it is effective to form the film over the resin cover 40, as shown in FIG. 7. On the other hand, when corrosive gases diffusively enter from the neighborhood of the metal base 10, much of the corrosive gases are trapped before arriving at the electronics apparatus by forming the film on the metal base 10.

Figure 8:
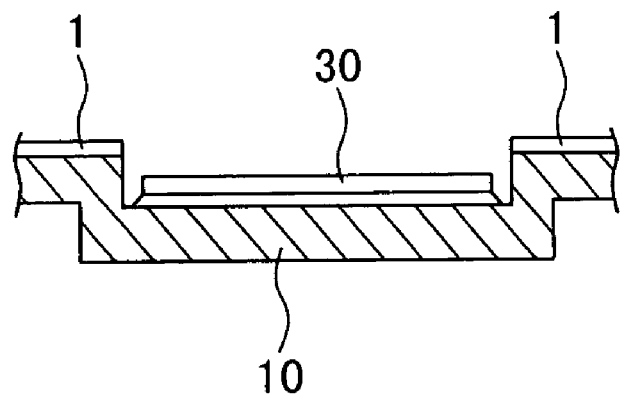
FIG. 8 is a sectional view showing the neighborhood of a metal base according to the present invention.

FIG. 8 shows an embodiment in which the film is formed on the metal base 10. The electronics apparatus according to this embodiment is configured so that, by denting the metal base on which the electronic circuit board 30 is disposed, and forming, on the portion around the dented portion, a film of the conductive material 1 having corrosiveness equal to or higher than that of the materials constituting the electronics circuitry, corrosive gases diffusively entering from the neighborhood of the metal base 1 are trapped. That is, the structure according to this embodiment is also a structure allowing the conductive material 1 to easily trap corrosive gasses before they arrive at the electronics apparatus when the corrosive gases diffusively enter from around the board along a horizontal direction.

Figure 9:
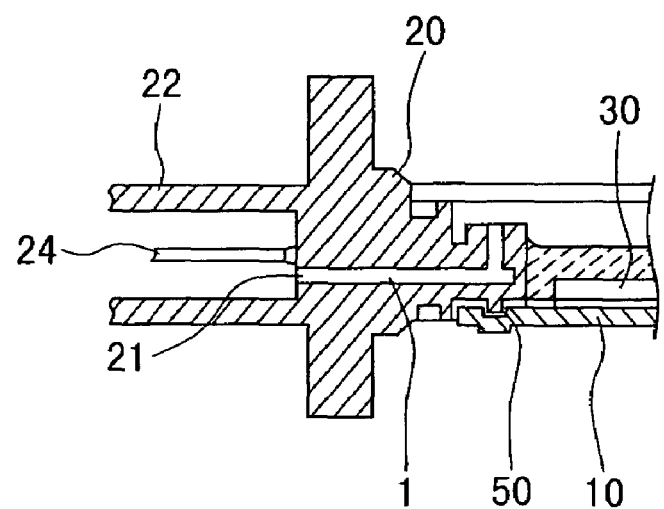
FIG. 9 is a sectional view showing the neighborhood of a ventilation hole according to the present invention.

FIG. 9 is a sectional view showing a structure in which a ventilation hole 21 is provided at a connector portion as shown in FIG. 1.

In general, a watertight connector is used for an electronics apparatus installed in an engine room. The watertight structure of the watertight connector relies upon a gasket made of a rubber material, and its permeability with respect to corrosive gases is not taken into account. As in the case of silicone resin, usual rubber materials have a relatively high gas permeability, so that corrosive gases pass through the rubber and diffuse inside the electronics apparatus. Therefore, a structure such as to have a ventilation hole 21 therein requires a configuration capable of coping with the entrance of corrosive gases. The present structure shown in FIG. 9 is one capable of trapping corrosive gases in the ventilation hole 21 by forming, also over the inner wall of the ventilation hole 21, the conductive material 1, in the form of a layer, having corrosiveness equal to or higher than that of the materials constituting the electronics circuitry.

Figure 10:
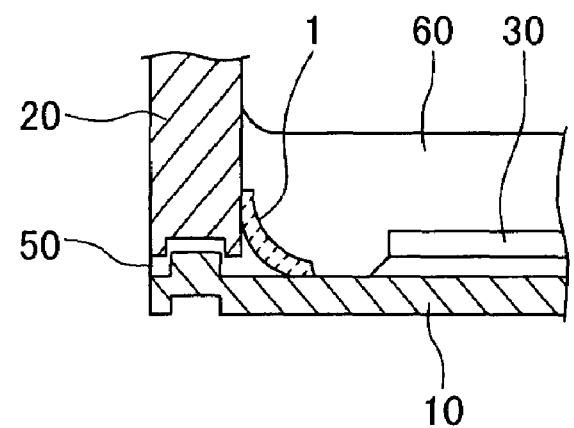
FIG. 10 is a sectional view showing an application portion of a conductive material according to the present invention.

FIG. 10 shows a sectional view showing a structure in which a film of the conductive material 1 is likewise formed inside the members constituting the case of the electronics apparatus. Specifically, this structure is one in which the film is formed inside the portion on which the silicone adhesive 50 has been applied, in order to efficiently trap corrosive gases entering from the silicone adhesive.

According to this structure, by forming a film on the inner wall of the application portion of the silicone adhesive 50 rather than by mixing the conductive material 1 into the silicone adhesive 50 itself, it is possible to trap corrosive gases entering from the aforementioned inner wall portion without changing the physical properties of the silicone adhesive 50. This advantageously allows the establishment of a highly reliable connection.

Figure 11A:
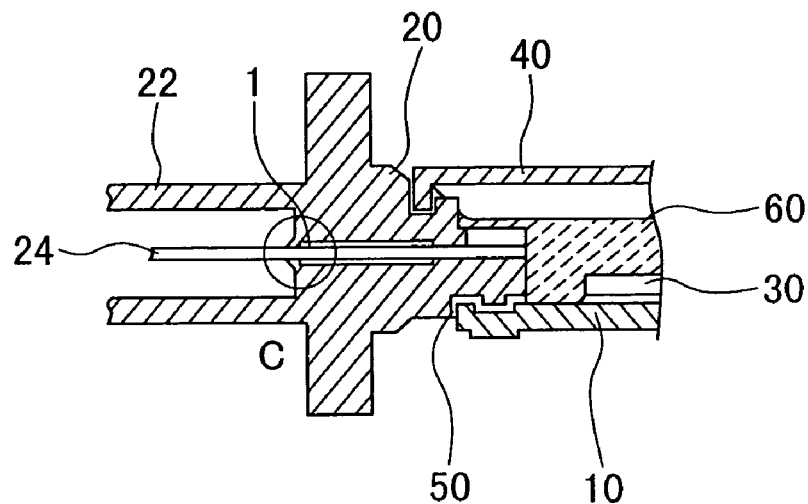
FIGS. 11A and 11B are sectional views showing a connector terminal portion according to the present invention.
Figure 11B:
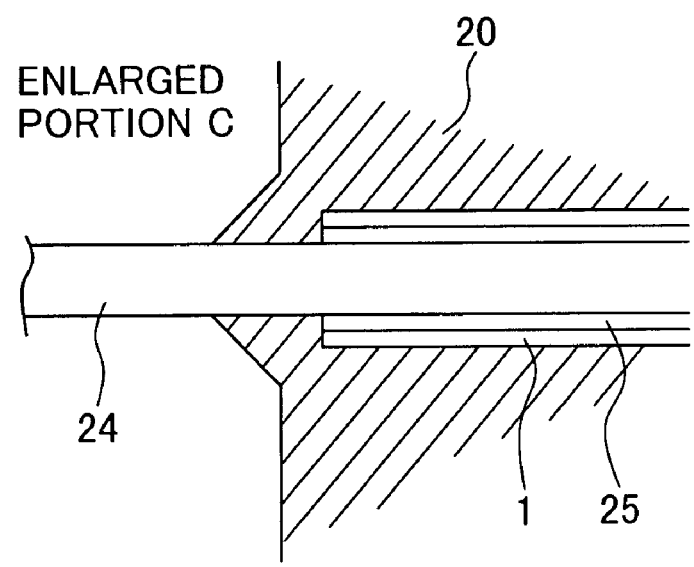

FIGS. 11A and 11B are sectional views showing a mounted state of a connector terminal 24 integrally molded with the resin housing 20. This terminal integrally molded with the resin housing 20 has a minute clearance at the interface with the resin. According to this structure, when corrosive gases enter from this clearance, the corrosive gases diffusing from the clearance between the connector terminal 24 and the resin housing 20 toward the inside of the electronics circuitry can be trapped, by directly forming or indirectly forming via an insulating layer 25, the conductive material 1 having corrodibility equal to or higher than that of the materials constituting the electronics circuitry, into a layer shape, over the portion hidden in the resin mold, out of the surface of the connector terminal 24.

Figure 12A:
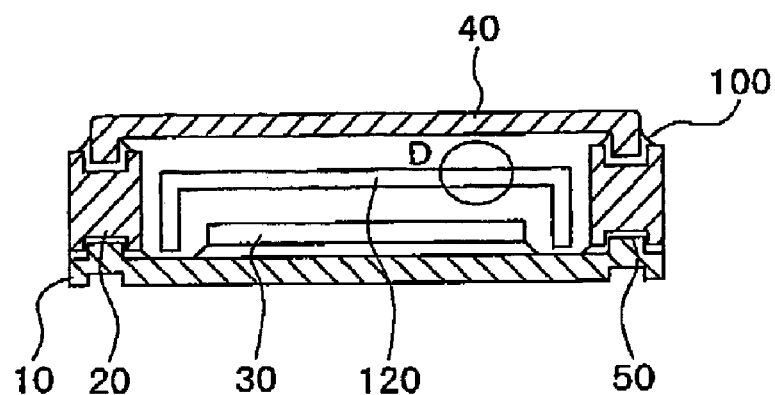
FIGS. 12A–12C are sectional views showing a module incorporating a plate-shaped structure according to the present invention.
Figure 12B:
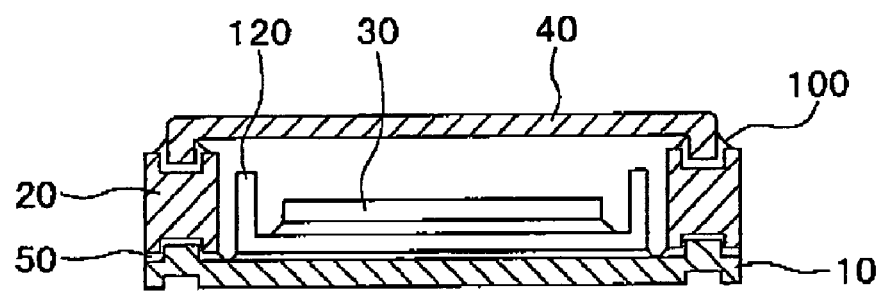
Figure 12C:
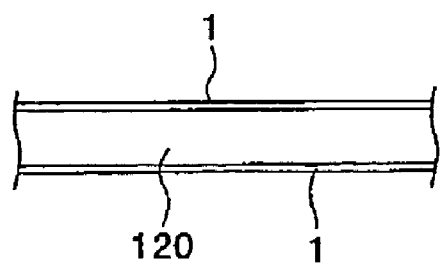

FIGS. 12A–12C are schematic sectional views each showing an embodiment of a structure to which a plate-shaped structure 120 is added, the plate-shaped structure 120 having the conductive material 1 that is applied to the surface thereof in the form of a layer, and that has corrosiveness equal to or higher than that of the materials constituting the electronics circuitry. As for the shape of the plate-shaped structure 1, for example, a bending portion is provided at each of the opposite ends of the plate-shaped structure 120, and the plate-shaped structure 120 is placed over the electronics circuitry 30 after its site has been adjusted to such an extent just as to cover the electronics circuitry (see FIG. 12A). Alternatively, the plate-shaped structure 120 is placed under the electronic circuit board 30 (see FIG. 12B), and the bending portions thereof are caused to rise, thereby forming a structure for protecting the board from corrosive gases. The enlarged view of the portion D in FIG. 12C shows that the conductive material 1 having corrosiveness equal to or higher than that of the materials constituting the electronics circuitry is formed into a film shape, over the surface of the plate-shaped structure 120. However, depending on the shape of the plate-shaped structure 120, the forming place of the conductive material 1 may be virtually determined based on the capability of trapping corrosive gases, in a way such as the entire periphery or only one portion of the plate-shaped structure 12.

When the plate-shaped structure 120 is placed over the electronic circuit board 30, e.g., aluminum wire bonding 80 is required in order to establish a connection between the electronic circuit board 30 and each of the terminal 23b for holding heat resistor element 70 and the like, and the connector terminal 23a. This may restrict the shape of the plate-shaped structure 120. With respect to possible interference places, an installable structure can be provided by taking structural countermeasures such as to provide through holes in portions of the plate-shaped structure 120 or remove portions of the bended portion thereof. Specifically, two places out of the bended portions covering the electronic circuit board 30 are used for connecting each of the connector terminal 23b and the connector terminal 23a for supporting a sensor for sensing flow and the electronic circuit board 30 by aluminum wire bonding 80, so that it is difficult to dispose the plate-shaped structure 120 at the aforementioned places. It is recommendable, therefore, to change the through hole configuration near these places into a configuration with the through holes removed. Furthermore, as required, increasing the number of the plate-shaped structures 120 to two or more by, for example, combining the structure in which the plate-shaped structure 120 is placed over the electronic circuit board 30 and that in which the plate-shaped structure 120 is placed under the electronic circuit board 30, produces an enhanced protective effect against corrosive gases.

FIG. 13 shows an embodiment of a structure in which the plate-shaped structure 120 used in the embodiment illustrated in FIG. 12 is simultaneously used as a shield for EMC. In this embodiment, the ground is connected to the metal base 10, and the construction of the electronic circuit board 30 side is simplified by connecting portions of the plate-shaped structure 120 to the metal base 10 with a conductive adhesive 140. This decreases the exposed wiring conductor portions, and reduces the number of required capacitors and inductors for EMC. In addition, since the plate-shaped structure 120 protects the electronic circuit board 30 against the entrance of corrosive gases, an electronics apparatus that simultaneously achieves EMC performance and corrosion resistance can be provided. In this case, in order to secure performance as an EMC shield, the conductive material 1 that has corrosiveness equal to or higher than that of the materials constituting the electronics circuitry, and that is applied to the surface of the plate-shaped structure 120 in the form of a layer may be formed via an insulating layer.

As other possible methods for establishing an electrical connection between the plate-shaped structure 120 and the metal base 10, there are many methods such as welding, press fit, wire bonding, screwing, and so on.

The present invention is also applicable to a pressure sensor, an air-fuel ratio sensor, an ECU electronic throttle device, etc, besides the above-described applications.

As is evident from the foregoing, the present invention allows the corrosion resistance of the flow sensing device or the electronics apparatus installed in an engine room for an automobile to be enhanced.

What is claimed is:

1. A flow sensing device, comprising:
   a flow sensing element for sensing a flow of a gas;
   electronics circuitry for processing a signal from said flow sensing element,
   a case for protecting said electronics circuitry provided inside said case; and
   trapping means for trapping corrosive compositions entering from the outside of said case into the inside thereof,
   wherein said flow sensing device is installed in an intake air passage of an engine by inserting said flow sensing element into said intake air passage of the engine; and
   wherein said trapping means comprises silver, copper, a silver alloy containing at least 83% of silver, or a copper alloy containing at least 83% of copper.

2. The flow sensing device according to claim 1, wherein said case is formed by bonding a metal component and plastic components together by a silicone adhesive, and wherein said corrosive compositions entered from the outside of said case into the inside thereof via said silicone adhesive, are trapped by said trapping means.

3. The flow sensing device according to claim 1, wherein said trapping means has corrosiveness by said entering corrosive compositions, equal to or larger than that of the wiring lines of said electronics circuitry.

4. The flow sensing device according to claim 1, further comprising a board on which said electronics circuitry and said trapping means are provided.

5. The flow sensing device according to claim 1, wherein said corrosive compositions comprise sulfur or compounds thereof.

6. The flow sensing device according to claim 1, wherein said trapping means is disposed between said silicone adhesive and said electronics circuitry.

7. A flow sensing device according to claim 1, wherein said corrosive compositions are compositions included in a gas which goes into inside of said case.

8. A flow sensing device, comprising:
a flow sensing element for sensing a flow of a gas;
electronics circuitry for processing a signal from said flow sensing element;
a case for protecting said electronics circuitry provided inside said case;
trapping means for trapping corrosive compositions entering from the outside of said case into the inside thereof; and
a gel covering said electronics circuitry, wherein said trapping means is mixed into said gel; and
wherein said flow sensing device is installed in an intake air passage of an engine by inserting said flow sensing element into said intake air passage of the engine.

9. A flow sensing device, comprising;
a flow sensing element for sensing a flow of a gas;
electronics circuitry for processing a signal from said flow sensing element;
a case for protecting said electronics circuitry provided inside said case; and
trapping means for trapping corrosive compositions entering from the outside of said case into the inside thereof,
wherein said flow sensing device is installed in an intake air passage of an engine by inserting said flow sensing element into said intake air passage of the engine; and
wherein said trapping means is electrically connected to the ground potential of said electronics circuitry.

10. A flow sensing device, comprising:
a flow sensing element for sensing a flow of a gas;
electronics circuitry for processing a signal from said flow sensing element; and
a case for protecting said electronics circuitry provided inside said case,
wherein said flow sensing device is installed in an intake air passage of an engine by inserting said flow sensing element into said intake air passage of the engine; and
wherein silver, copper, a silver alloy containing at least 83% of silver, or a copper alloy containing at least 83% of copper each of which hardly affects the function of said electronics circuitry even if it becomes corroded, is disposed inside said case in an exposed state.

11. The flow sensing device according to claim 10, further comprising a board having said electronics circuitry mounted thereon, wherein said silver, copper, a silver alloy containing at least 83% of silver, or a copper alloy containing at least 83% of copper, is provided on said board.

12. An electronics apparatus, comprising:
electronics circuitry;
a case for protecting said electronics circuitry provided inside said case; and
trapping means for trapping corrosive compositions entering from the outside of said case into the inside thereof,
wherein said electronics apparatus is installed in an engine room; and
wherein said trapping means comprises silver, copper, a silver alloy containing at least 83% of silver, or a copper alloy containing at least 83% of copper.

13. The electronics apparatus according to claim 12, wherein said trapping means has corrosiveness by said entering corrosive compositions, equal to or larger than that of the wiring lines of said electronics circuitry.

14. The electronics apparatus according to claim 12, further comprising a board on which said electronics circuitry and said trapping means are provided.

15. The electronics apparatus according to claim 12, wherein said corrosive compositions comprise sulfur or compounds thereof.

16. The electronics apparatus according to claim 12, wherein said case is formed by bonding a plurality of components together by an adhesive, and wherein said trapping means is disposed between said adhesive and said electronics circuitry.

17. The electronics apparatus according to claim 12, wherein said electronics apparatus comprises any one of a flow sensing device for sensing a flow of an intake gas in said engine, a pressure sensor for sensing a pressure of the intake gas in said engine, an air-fuel ratio sensor for sensing an air-fuel ratio of exhaust gases from said engine, and an electronic throttle device for controlling the flow of the intake gas in said engine.

18. An electronics apparatus, comprising:
electronics circuitry;
a case for protecting said electronics circuitry provided inside said case;
trapping means for trapping corrosive compositions entering from the outside of said case into the inside thereof; and
a gel covering said electronics circuitry, inside said case, wherein said trapping means is mixed into said gel;
wherein said electronics apparatus is installed in an engine room.

19. The electronics apparatus, comprising:
electronics circuitry;
a case for protecting said electronics circuitry provided inside said case; and
trapping means for trapping corrosive compositions entering from the outside of said case into the inside thereof,
wherein said electronics apparatus is installed in an engine room; and
wherein said trapping means is electrically connected to the ground potential of said electronics circuitry.

* * * * *